United States Patent [19]

Leszczak

[11] Patent Number: 4,790,440

[45] Date of Patent: Dec. 13, 1988

[54] REVOLVING FILE WITH SWIVEL BASE

[75] Inventor: John Leszczak, Roselle Park, N.J.

[73] Assignee: The Bates Manufacturing Company, Hackettstown, N.J.

[21] Appl. No.: 925,710

[22] Filed: Oct. 30, 1986

[51] Int. Cl.⁴ .............................................. B42F 17/00
[52] U.S. Cl. ........................................ 211/11; 211/50; 211/58; 40/379; 108/94
[58] Field of Search ................ 211/11, 50, 58, 131, 211/163, 144, 69.1; 40/380, 377, 378, 379, 384; 108/94; 312/125

[56] References Cited

U.S. PATENT DOCUMENTS

| D. 251,848 | 5/1979 | Hollerith | D19/76 |
|---|---|---|---|
| D. 280,423 | 9/1985 | Burton et al. | D19/76 |
| 1,894,146 | 1/1933 | Baker | 108/94 X |
| 2,389,923 | 11/1945 | Miller | 40/379 |
| 2,522,986 | 9/1950 | Bruen | 40/377 |
| 2,731,966 | 1/1956 | Neilsen | 129/16 |
| 3,106,920 | 10/1963 | Scholfield et al. | 40/379 X |
| 3,260,006 | 7/1966 | Dunajew | 40/124 |
| 3,628,269 | 12/1971 | Dahl, Jr. | 40/68.6 |
| 4,035,938 | 7/1977 | Neilsen | 40/68.6 |
| 4,121,523 | 10/1978 | Hastings | 109/2 |
| 4,192,425 | 3/1980 | Landau et al. | 211/69.1 X |
| 4,406,368 | 9/1983 | Hermes | 211/69.1 X |

FOREIGN PATENT DOCUMENTS 716823 10/1954 United Kingdom .................. 211/58

Primary Examiner—Ramon S. Britts
Assistant Examiner—Blair M. Johnson
Attorney, Agent, or Firm—Edward R. Weingram

[57] ABSTRACT

A card file of compact and efficient design which is fitted with a compact rotary base and separate stabilizers fastened to the bottom surface of the card file. A swivel base and stabilizers attached to the file housing provide a low profile, lighweight and efficient means by which the card file can be swivelled to any desired position in the horizontal plane. Adjusting means are also available to ensure that the stabilizing means can accommodate any irregularities in the bottom surface of the file or other object to which the swivel is attached in order to provide a proper disposition of the stabilizing elements.

5 Claims, 3 Drawing Sheets

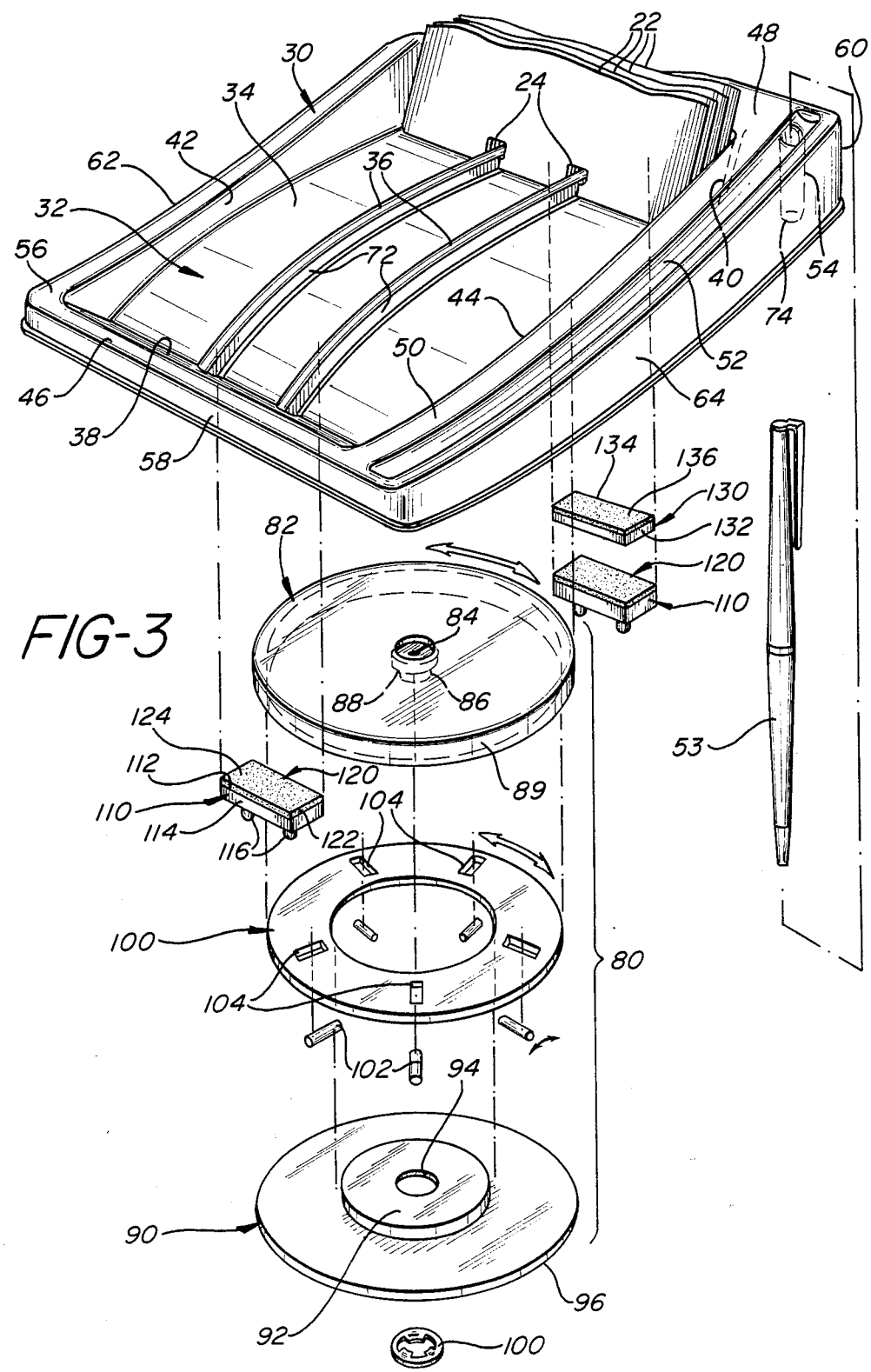

REVOLVING FILE WITH SWIVEL BASE

BACKGROUND OF THE INVENTION

1. Field of the Invention

The present invention relates to card holders and particularly to card holders which can horizontally swivel when placed on a horizontal surface, such as a desk.

The invention also relates to swivel bases which can be attached to various devices to enable these devices to conveniently swivel when placed on horizontal surfaces.

2. Description of the Prior Art

Rotary card files have long been in use such as shown in U.S. Pat. Nos. 3,628,629 to Dahl, issued Dec. 21, 1971, entitled Magnetic Card Index; 3,260,006 to Dunajew, issued July 12, 1966, entitled Card Clip; and 2,731,966 to Neilsen, issued Jan. 24, 1956, entitled Rotary Card - Filing Device. Similarly, open type card files that are not rotary in nature have been shown as, for example, in Applicant's Design U.S. Pat. No. 251,848 to Hollerith, issued May 15, 1979.

All of these files are meant to be placed on desks or used in office locations where they are often moved about and become difficult to view. To facilitate the use of these devices to assist the viewer in viewing the contents, attempts have been made to provide means to swivel these files as, for example, in U.S. Pat. No. 4,035,938 to Neilsen, issued July 19, 1977, or Design Pat. No. Des. 280,423, issued Sept. 3, 1985, to Burton et al.

As can be seen from the Neilsen U.S. No. 4,035,938 and Burton U.S. Pat. No. Des. 280,423 patents, the swivel means are usually large and cumbersome. They must be large in order to stabilize the device and in doing so they also tend to elevate the device fairly high above the work surface, which tends to add instability to the device.

SUMMARY OF THE INVENTION

The present invention provides a card file of compact and efficient design which is fitted with a compact rotary base and separate stabilizers fastened to the bottom surface of the card file. A swivel base and stabilizers attached to the file housing provide a low profile, lightweight and efficient means by which the card file can be swivelled to any desired position in the horizontal plane. Adjusting means are also available to ensure that the stabilizing means can accommodate any irregularities in the bottom surface of the file or other object to which the swivel is attached in order to provide a proper disposition of the stabilizing elements.

Accordingly, it is an object of the present invention to provide a card file with a swivel base which can rotate to any desired direction.

It is another object of the present invention to provide a card file with a swivel base which can be easily used and positioned, and which provides a convenient means for rotating the item to any desired location.

Another object of the present invention is to provide a card file with a swivel base which includes stabilizing means to ensure that the card file will not tip over during positioning or movement of the card file.

Yet another object of the present invention is to provide a card file with a swivel base which includes stabilizing means positioned remotely from the swivel base to provide maximum stabilizing effect with a minimum of weight and structural change required in the object.

Still another object of the present invention is to provide a card file with a swivel base which is durable, does not jam, and is relatively inexpensive to fabricate.

Yet another object of the present invention is to provide a card file with a swivel base including stabilizing means which stabilizing means includes adjusting means to ensure that the stabilizing means are at the appropriate height for proper operation.

Yet another object of the present invention is to provide a swivel base which can be used with a variety of items which provides a low profile, and which is not bulky, and further which is easy to install on the items to which it will be attached.

Yet another object of the present invention is to provide a swivel base arrangement which includes separate stabilizing units which can be placed remotely from the moving portions of the swivel base to stabilize the item that is being supported by the swivel base.

Yet another object of the present invention is to provide a swivel base which does not elevate the item high above the work surface, or desk, on which it is placed, and which is durable, is easy to swivel or rotate, and relatively inexpensive to fabricate.

Still another object of the present invention is to provide a swivel base which can be used to support various office items which is adaptable for use with a wide variety of items, which does not easily jam or clog, which can be easily installed, and which does not require any additional tools or adhesives when the item is sold as a kit.

Other objects and advantages will be apparent from the following description of the invention and the novel features will be particularly pointed out hereinafter in the claims.

BRIEF DESCRIPTION OF THE DRAWINGS

The invention is illustrated in the accompanying drawings in which:

FIG. 3 is an exploded view of the card holder and swivel base assembly.

DETAILED DESCRIPTION OF THE INVENTION

Figure 1:
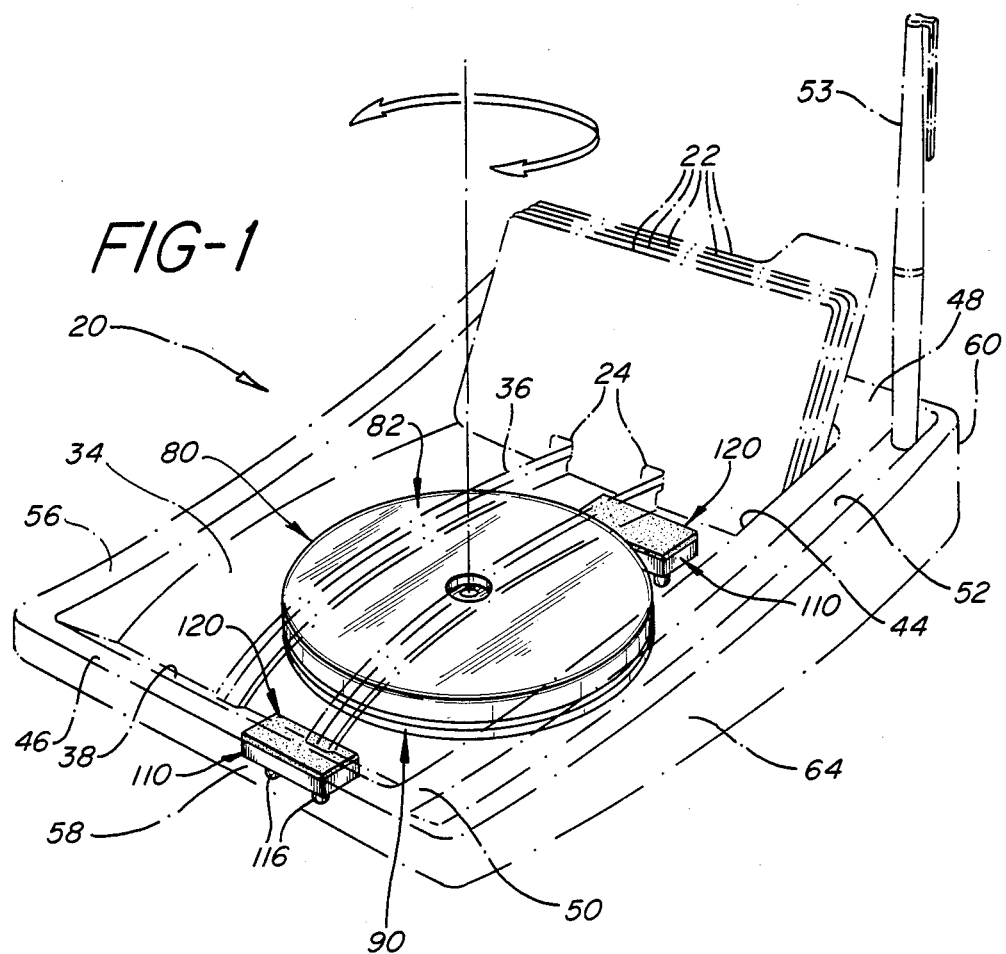
FIG. 1 is a front upper perspective showing the card holder with a swivel base assembly with the card holder and cards in phantom view.
Figure 2:
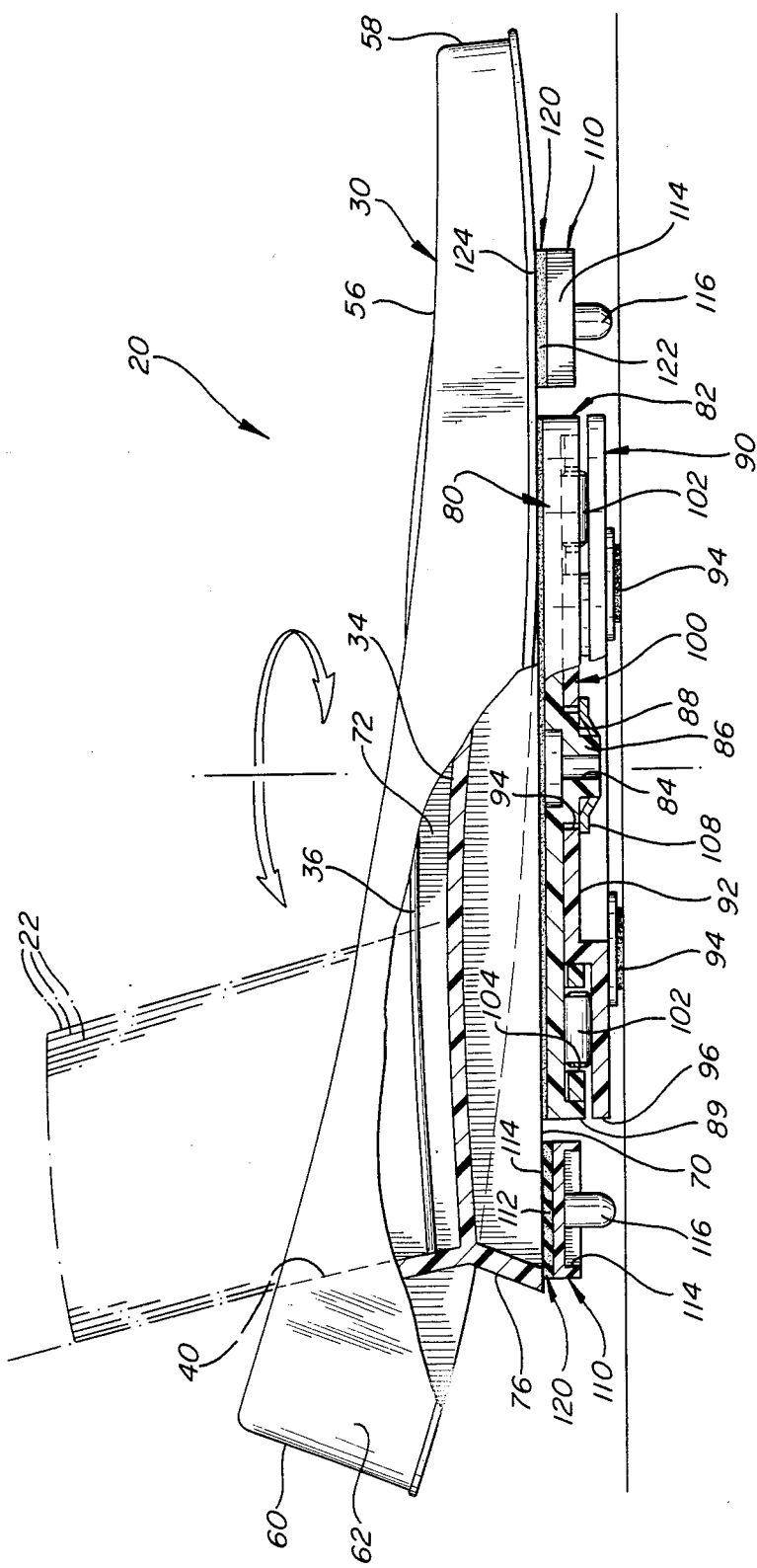
FIG. 2 is a side elevation partially broken away of the card holder and swivel base assembly.

Referring to the figures, a card file generally indicated at 20 has a plurality of cards 22, each of which has two T-shaped slots which are adapted to have the card fit on to a holding means in the card holder to be described. The card file has a top surface generally indicated at 30, which includes a card well generally indicated at 32 having an arcuate surface 34 on which the cards are intended to rest, and two card holding rails 36, which are adapted to coact with the T-shaped slots 24. The card well 32 has a front surface 38, a back surface 40, a left side 42 and a right side 44. The sides of the well coact with relatively horizontal front upper surface 46, rear upper surface 48, left upper surface 56 and right upper surface 50. The right upper surface 50 has a groove 52 adapted to hold a pencil or pen 53 and a well 54 adapted to position the pencil for easy use. The upper generally horizontal surfaces of the card holder end in vertical skirts, namely, a front skirt 58, a rear skirt 60 and left and right skirts 62 and 64 respectively. The bottom surface generally indicated at 70 of the card holder 20 has a plurality of ribs 72. The bottom of the skirts form a horizontal surface on which the card holder would rest if there were no swivel base. Additionally, the bottom of the well 74 extends down to form a rear skirt 76 which rear skirt supports the ribs 72.

The swivel base generally indicated at 80 consists of a top member generally indicated at 82, a bottom member generally indicated at 90 and an internal bearing cage 100 fixed to the top member 102 and rests between the end lip 89 of the top member and step 92 of the bottom member. The roller bearings 102 are free to rotate in the receptacles 104 to provide relative motion between the swivel base top 82 and bottom 90. The top member is rotatably connected to the bottom member by means of the fastening end 84 protruding through a passage 98 in bottom member 90. Fastening end 84 extends from a shoulder 88 which is at even height with the bottom surface of the stepped portion 92 of bottom member 90. A fastener 108 presses on the fastening end 86 of the top member 82 and the bottom surface of the step portion 92 of the bottom member to hold the top member in axial alignment with the bottom member and to prevent separation of the two.

Note that the top member is relatively flat except for the depression at the central area at which shoulder 88 is formed. A bore 84 is formed in the fastening end for purposes of alignment while manufacturing.

The swivel base is connected to the horizontal bottom surface of ribs 72 by means of self-adhesive strips which fasten to the top surface of the top member 82 and the bottom of the ribs.

Mounted on the forward and rearward portion of the bottom of ribs 72 are stabilizers generally indicated at 110 which generally have an upper portion 112 and a side skirt portion 114 and two feet 116 which extend downward and extend almost to the level of the traction feet 94 that extend from the bottom member 90 to act as a non-slip footing for the swivel base.

The positioning of the stabilizers radially outward from the circumferential end of the swivel base adds a substantial amount of stability to the assembly. The feet have rounded ends which would allow them to slide relative to the surface without scratching or otherwise marring the surface. The stabilizers are connected to the underside of the ribs 72 by means of connector means generally indicated at 120 which consist of a foam layer 122 having adhesive on either side so that one side connects to the top of the stabilizers 112 and the other part will attach to the bottom of ribs 72.

As shown in FIG. 3, the rear stabilizer also has a spacer 130 consisting of a hardened central portion 132 with a foam portion 134 fastened to it by adhesive on one side and the other side having adhesive so that this can also be fastened to the bottom of the item that the spacer and stabilizer combination will extend from. The purpose of the spacer is to account for any irregularities that may occur in the shape of the bottom surface or level of the bottom surface so that the stabilizers can always be brought down close to the horizontal surface on which the swivel base is mounted.

Note that in the final assembled position the card tray with the swivel base is a neat, compact item that does not take up any appreciably greater space than with the card tray by itself, but allows for flexibility and ease of operation. The writing implement 53 fits into the well 54 on the top surface or can lay in the groove 52 on the top surface. When the writing implement is placed in the well 54, it serves as a convenient crank for rotating or swivelling the card file to the desired position for the user.

Note that the swivel base is readily easy to use and very adaptable since it can be fastened by means of adhesive or double-sided adhesive strips similar to the type used in fastening the stabilizers to the underside of the card holder. The combination of the stabilizers with the swivel base allows for unusually great stability in connection with any of the items to which the swivel base could be mounted. Because of the relatively low height of the swivel base there are relatively little problems with respect to tipping or knocking over of any items to which it is attached. These, of course, are even further reduced by means of the stabilizer members which have been described.

It will be understood that various changes in the details, materials, arrangements of parts and operating conditions which have been described and illustrated in order to explain the nature of the invention, may be made by those skilled in the art within the principles and scope of the invention.

Having thus set forth the nature of the invention, what is claimed herein is:

1. A swivelable card file comprising:
   a card file housing having a bottom surface;
   a swivel base;
   said swivel base comprising:
   a top member;
   a bottom member;
   roller bearing means slideably coacting with the top member and with the bottom member;
   fastening means rotatably fastening the top member with the bottom member;
   connecting means connecting said top member to said bottom surface; and
   stabilizer means radially displaced from said swivel base and extending from said bottom surface to approximately the plane of said bottom member.

2. A swivelable card file according to claim 1 wherein the stabilizer means further comprising spacer means to adjust the height of the stabilizer members relative to the bottom surface of the card file housing.

3. A swivelable card file according to claim 1 wherein the card file housing includes:
   an upper surface;
   a groove in the upper surface; and
   a well in the groove of the upper surface adapted to receive a writing implement.

4. A swivel base kit for swivelably supporting equipment adapted to rest on a horizontal surface comprising:
   a flat top member adapted to be fastened to the underside of the equipment to be supported;
   a bottom member;
   a bearing cage disposed between the top member and the bottom member;
   a plurality of roller bearings disposed in the bearing cage in rolling contact with the top member and the bottom member to provide relative rotation between the top member and the bottom member;
   connecting means connecting said top and bottom members, said connecting means comprising:
   a centrally disposed passage means formed in said bottom member;
   a fastening end formed in said top member extending through said passage means; and a fastener coacting with said fastening end to hold said members in axial alignment; and stabilizer members adapted to be fastened to the bottom of said equipment, said members comprising a top surface and feet members extending downward therefrom, the height of said members being slightly less than the height of said bottom member.

5. A swivel base according to claim 4 further comprising spacer means adapted to be fastened to the stabilizer means to adjust the height of the stabilizer means to compensate for irregularities in an object to which these items are attached.

* * * * *